US007782170B2

(12) United States Patent
Robert

(10) Patent No.: US 7,782,170 B2
(45) Date of Patent: Aug. 24, 2010

(54) LOW CONSUMPTION AND LOW ACTUATION VOLTAGE MICROSWITCH

(75) Inventor: Philippe Robert, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 126 days.

(21) Appl. No.: 10/593,876

(22) PCT Filed: Apr. 4, 2005

(86) PCT No.: PCT/FR2005/000815

§ 371 (c)(1),
(2), (4) Date: Sep. 22, 2006

(87) PCT Pub. No.: WO2005/101434

PCT Pub. Date: Oct. 27, 2005

(65) Prior Publication Data

US 2007/0215447 A1 Sep. 20, 2007

(30) Foreign Application Priority Data

Apr. 6, 2004 (FR) .................................. 04 03586

(51) Int. Cl.
*H01H 61/04* (2006.01)
*H01H 37/54* (2006.01)
*H01H 57/00* (2006.01)
*F02C 1/04* (2006.01)
*H02N 10/00* (2006.01)

(52) U.S. Cl. .......................... 337/85; 337/141; 337/27; 337/365; 200/181; 310/307; 60/529

(58) Field of Classification Search .................. 337/85, 337/141, 27, 365; 200/181; 60/529; 310/307
See application file for complete search history.

(56) References Cited

U.S. PATENT DOCUMENTS 4,423,401 A * 12/1983 Mueller ...................... 337/107
5,029,805 A * 7/1991 Albarda et al. ................ 251/11
5,058,856 A * 10/1991 Gordon et al. ................ 251/11
5,065,978 A * 11/1991 Albarda et al. .............. 257/419
5,629,565 A * 5/1997 Schlaak et al. .............. 257/780
5,635,750 A * 6/1997 Schlaak et al. .............. 257/414

(Continued)

FOREIGN PATENT DOCUMENTS

EP 1 308 977 A2 5/2003

(Continued)

OTHER PUBLICATIONS

Saias et al.; "An Above-IC RF-MEMS Switch;" IEEE International Solid-State Circuits Conference; Feb. 9, 2003; XP010661612; *Microsensors and Biomems*; Paper 11.8.

*Primary Examiner*—Jayprakash N Gandhi
*Assistant Examiner*—Bradley H Thomas
(74) *Attorney, Agent, or Firm*—Oliff & Berridge, PLC

(57) ABSTRACT

A microswitch comprises a deformable membrane including two substantially parallel flexure arms, attached to a substrate via at least one end thereof and comprising thermal actuating means. An elongated contact arm, substantially parallel with the flexure arms, is arranged therebetween and attached thereto at the high deformation areas thereof. The contact arm moves in a direction substantially parallel to the substrate upon actuation of the microswitch, and comprises electrostatic holding electrodes and a conducting pad.

8 Claims, 3 Drawing Sheets

U.S. PATENT DOCUMENTS

| | | | | |
|---|---|---|---|---|
| 5,796,152 | A * | 8/1998 | Carr et al. | 257/415 |
| 5,905,241 | A * | 5/1999 | Park et al. | 200/409 |
| 6,091,050 | A * | 7/2000 | Carr | 219/201 |
| 6,100,477 | A * | 8/2000 | Randall et al. | 200/181 |
| 6,115,231 | A * | 9/2000 | Shirakawa | 361/233 |
| 6,153,839 | A * | 11/2000 | Zavracky et al. | 200/181 |
| 6,236,300 | B1 * | 5/2001 | Minners | 337/139 |
| 6,239,685 | B1 * | 5/2001 | Albrecht et al. | 337/365 |
| 6,307,169 | B1 * | 10/2001 | Sun et al. | 200/181 |
| 6,307,452 | B1 * | 10/2001 | Sun | 333/262 |
| 6,310,339 | B1 * | 10/2001 | Hsu et al. | 250/214.1 |
| 6,376,787 | B1 * | 4/2002 | Martin et al. | 200/181 |
| 6,396,368 | B1 * | 5/2002 | Chow et al. | 333/262 |
| 6,489,857 | B2 * | 12/2002 | Petrarca et al. | 333/105 |
| 6,621,387 | B1 * | 9/2003 | Hopcroft | 333/262 |
| 6,657,525 | B1 * | 12/2003 | Dickens et al. | 335/78 |
| 6,703,916 | B2 * | 3/2004 | Charvet et al. | 337/141 |
| 6,720,851 | B2 * | 4/2004 | Hallbjorner et al. | 335/78 |
| 6,768,412 | B2 * | 7/2004 | Becka et al. | 337/36 |
| 6,787,438 | B1 * | 9/2004 | Nelson | 438/584 |
| 6,794,101 | B2 * | 9/2004 | Liu et al. | 430/48 |
| 6,803,534 | B1 * | 10/2004 | Chen et al. | 200/181 |
| 6,806,545 | B2 * | 10/2004 | Shim | 257/420 |
| 6,812,820 | B1 * | 11/2004 | Fouillet | 337/333 |
| 6,842,097 | B2 * | 1/2005 | Hsu et al. | 335/78 |
| 6,876,482 | B2 * | 4/2005 | DeReus | 359/290 |
| 6,919,784 | B2 * | 7/2005 | Feng et al. | 335/78 |
| 6,924,966 | B2 * | 8/2005 | Prophet | 361/207 |
| 7,002,441 | B2 * | 2/2006 | Pillans et al. | 335/78 |
| 7,031,137 | B2 * | 4/2006 | Robert | 361/281 |
| 7,084,724 | B2 * | 8/2006 | Cetiner et al. | 333/262 |
| 7,230,513 | B2 * | 6/2007 | Chou | 333/262 |
| 7,283,023 | B2 * | 10/2007 | Robert | 335/78 |
| 7,372,348 | B2 * | 5/2008 | Xu et al. | 335/78 |
| 7,411,792 | B2 * | 8/2008 | Richards et al. | 361/704 |
| 7,420,444 | B2 * | 9/2008 | Kim et al. | 333/262 |
| 2002/0027487 | A1 * | 3/2002 | Suzuki | 333/262 |
| 2002/0140533 | A1 * | 10/2002 | Miyazaki et al. | 335/78 |
| 2002/0145493 | A1 * | 10/2002 | Wang | 335/78 |
| 2002/0160549 | A1 | 10/2002 | Subramanian et al. | |
| 2003/0034870 | A1 * | 2/2003 | Becka et al. | 337/36 |
| 2003/0038703 | A1 * | 2/2003 | Weaver et al. | 337/335 |
| 2003/0102771 | A1 | 6/2003 | Akiba et al. | |
| 2003/0137389 | A1 * | 7/2003 | Weaver et al. | 337/36 |
| 2004/0061579 | A1 * | 4/2004 | Nelson | 335/78 |
| 2005/0183938 | A1 * | 8/2005 | Chou | 200/181 |
| 2005/0206243 | A1 * | 9/2005 | Bouche | 307/112 |
| 2005/0219016 | A1 * | 10/2005 | Chou et al. | 335/78 |
| 2006/0131150 | A1 * | 6/2006 | Yuba et al. | 200/329 |

FOREIGN PATENT DOCUMENTS

EP 1 321 957 A1 6/2003

* cited by examiner

LOW CONSUMPTION AND LOW ACTUATION VOLTAGE MICROSWITCH

BACKGROUND OF THE INVENTION

The invention relates to a microswitch comprising:

a deformable membrane attached to a substrate, actuating means designed to deform the membrane, from a first stable position of the microswitch, in such a way as to establish an electric contact between at least a first conducting pad formed on the substrate and at least a second conducting pad formed on a bottom surface of the membrane, in a second stable position, and electrostatic holding means designed to hold the microswitch in the second stable position and comprising complementary electrostatic holding means respectively fixedly secured to the membrane and to the substrate.

STATE OF THE ART

Microswitches are very widely used, in particular in the telecommunications field for signal routing, impedance matching networks, amplifier gain adjustment, etc. The frequency bands of the signals to be switched can range from a few MHz to several tens of GHz.

Conventionally, microswitches coming from microelectronics and used for radio-frequency circuits are able to be integrated with the circuit electronics and have a low manufacturing cost. Their performances are however limited.

For example, FET (Field Effect Transistor) type microswitches, made of silicon, can switch high-power signals at low frequency only. MESFET (Metal Semiconductor Field Effect Transistor) type microswitches, made of gallium arsenide (GaAs), operate well at high frequency, but only for low-level signals. In a general manner, above 1 GHz, all these microswitches present a high insertion loss in the closed (on) state, around 1 dB to 2 dB, and a fairly low insulation in the open (off) state, of about −20 dB to −25 dB.

To remedy these shortcomings, MEMS (Micro Electro Mechanical System) type microswitches have been proposed, which on account of their design and operating principle present the following features: low insertion loss (typically less than 0.3 dB), high insulation (typically greater than −30 dB), low consumption and linearity of response.

Two main actuating principles are known for such MEMS type microswitches, i.e. electrostatic actuation and thermal actuation. Microswitches with electrostatic actuation present the advantage of having a high switching rate and a relatively simple technology. They do however encounter problems of dependability, in particular due to an increased risk of sticking of the microswitch structure, and they only allow small movements. Microswitches with thermal actuation present the advantage of having a low actuation voltage (less than 5V), a high energy density and a large deflection amplitude, but they do encounter problems of excessive consumption and present a low switching rate.

To remedy these shortcomings, it has been proposed to combine these two major types of microswitches and to provide a microswitch with thermal actuation and electrostatic holding.

As represented in FIGS. 1 to 3, a microswitch 1 conventionally comprises a deformable membrane or beam 2, attached to a substrate 3 via the two ends thereof. Actuating means 4 enable the beam 2 to be deformed, from a first stable position represented in FIG. 1, so as to establish an electric contact between a first conducting pad 5 formed on the substrate 3 and a second conducting pad 6 fixedly secured to a bottom face of the beam 2, in a second stable position represented in FIG. 3.

The actuating means 4 for example comprise thermal actuators 7 operating in conjunction with heating resistors 8 inserted in the ends of the beams 2. The microswitch 1 also comprises complementary electrostatic holding means 9, respectively fixedly secured to the beam 2 and to the substrate 3. The electrostatic holding means 9 are designed to keep the microswitch 1 in the second stable position (FIG. 3).

Change of position of the microswitch 1 is represented in FIGS. 1 to 3. In FIG. 1, the beam 2 is in its first stable position. The actuating means 4 and the electrostatic holding means 9 are not solicited. In FIG. 2, the temperature variation caused by the thermal actuator 7, represented by the waves and arrows 10, causes the beam 2 to be deformed. The conducting pad 6 of the beam 2 then comes into contact with the conducting pad 5 of the substrate 3 to establish an electric contact. In FIG. 3, electrostatic forces 11 between the electrostatic holding means 9 are then generated to keep the beam 2 in this stable position. When the stable position is reached, thermal actuation is interrupted and the stable position is then kept by the electrostatic forces 11. When electrostatic holding is interrupted, i.e. when the electrostatic forces 11 are deactivated, the beam 2 reverts to its non-deformed state, i.e. to the first stable position represented in FIG. 1, and the electric contact is interrupted.

The different deformation areas of the beam 2 are illustrated in FIG. 4, these areas presenting more or less large displacements. The central area 16, represented in dark grey, illustrates the area of largest deformation of the beam 2, i.e. the location of the conducting pad 6 and the contact area of the beam 2 with the substrate 3. The intermediate areas 17 and 18 represent the areas of the beam 2 solicited by the electrostatic holding means 9. The end areas 19, represented in light grey, comprise the thermal actuating means 4 and correspond to the parts of the beam 2 that do not deform or hardly deform.

Most of the electric consumption of the microswitch 1 is thus limited solely to the fraction of time necessary for the microswitch to move from the first stable position (FIG. 1) to the second stable position (FIG. 3). The electrostatic holding voltage is reduced, as the forces 11 are applied to the deformed beam 2 (FIGS. 3 and 4). The electric consumption of the microswitch 1, and also the actuation voltage and electrostatic holding voltage, are therefore relatively low.

However, as the holding electrodes 9 are attached to the beam 2, they deform like the beam 2. The area with a small air-gap, i.e. the height between the electrostatic holding means 9 of the beam 2 and of the substrate 3 in the second stable position (FIG. 3), is therefore reduced laterally. The reduction of the holding voltage is consequently limited, in particular in comparison with simple electrostatic actuation. Moreover, deformation of the electrostatic holding means 9 attached to the beam 2 may give rise to problems of dependability of the microswitch 1.

OBJECT OF THE INVENTION

The object of the invention is to remedy these shortcomings and has the object of providing a dependable microswitch presenting a low actuation voltage and a low consumption.

According to the invention, this object is achieved by the accompanying claims and more particularly by the fact that the membrane comprises at least:

two substantially parallel flexure arms, attached to the substrate via at least one of the ends thereof and comprising the actuating means, and at least one contact arm, substantially parallel to the flexure arms, arranged between the flexure arms and attached to the flexure arms in the high deformation areas of the flexure arms, the contact arm moving in a direction substantially parallel to the substrate on actuation of the microswitch, and comprising the electrostatic holding means of the membrane and the second conducting pad.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
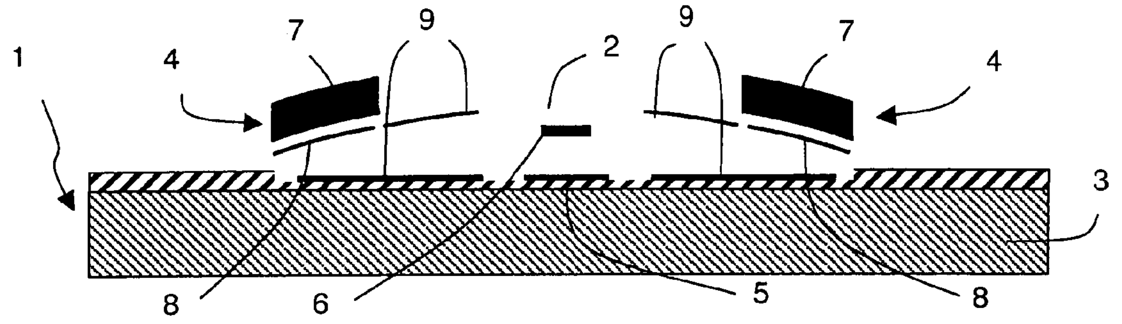
FIG. 1 (Prior Art)
FIGS. 1 to 3 represent the change of position of a deformable beam of a microswitch with thermal actuation and electrostatic holding according to the prior art.
Figure 2:
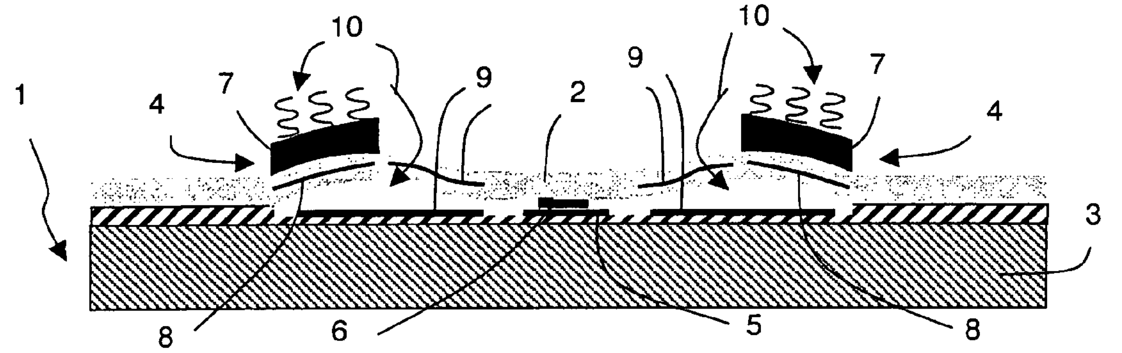
FIG. 2 (Prior Art)
Figure 3:
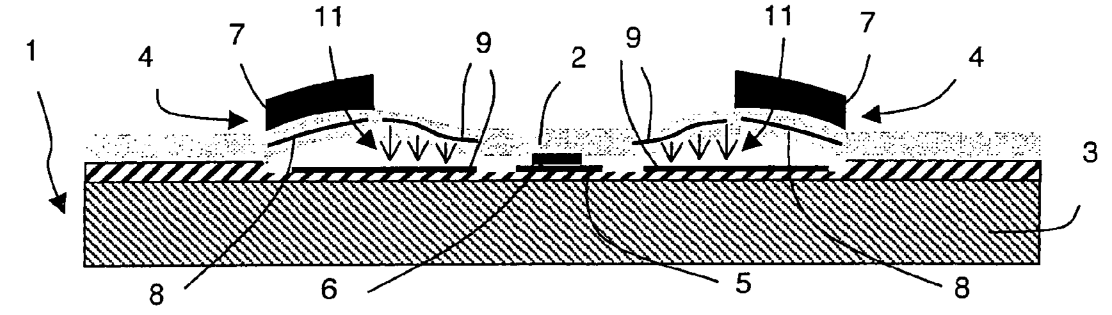
FIG. 3 (Prior Art)
Figure 4:
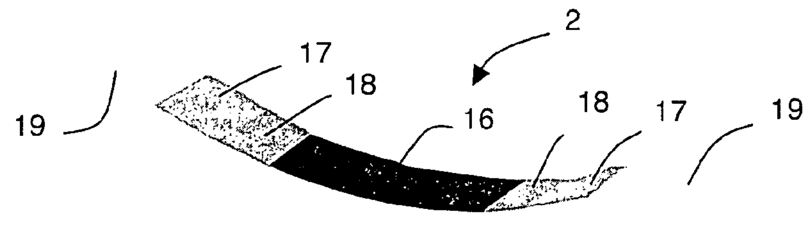
FIG. 4 (Prior Art)
FIG. 4 represents the deformation of the beam according to FIGS. 1 to 3, in perspective view.
Figure 5:
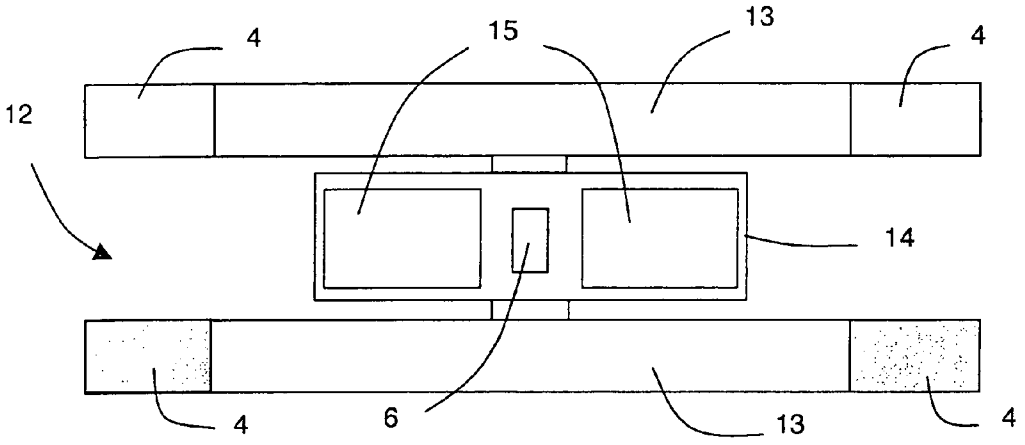
FIG. 5 represents a first embodiment of a deformable membrane of a microswitch according to the invention, in top view.
Figure 6:
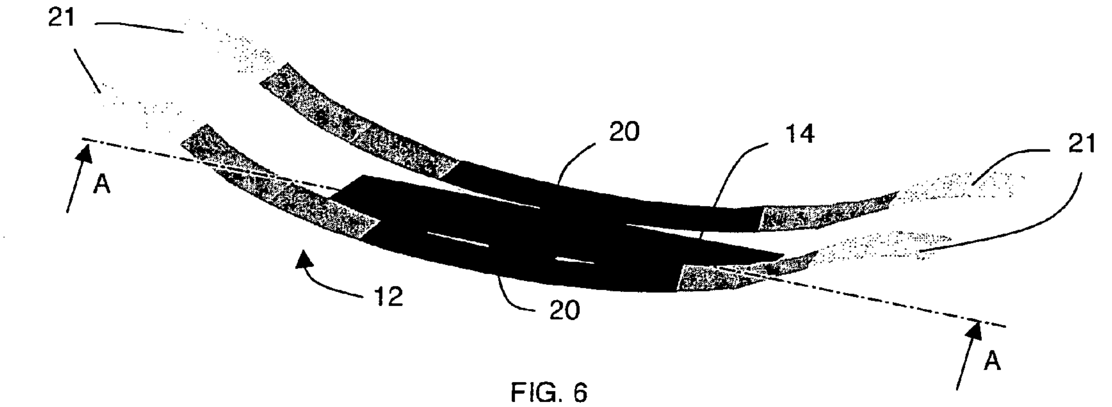
FIG. 6 represents the deformation of the membrane according to FIG. 5, in perspective view.
Figure 7:
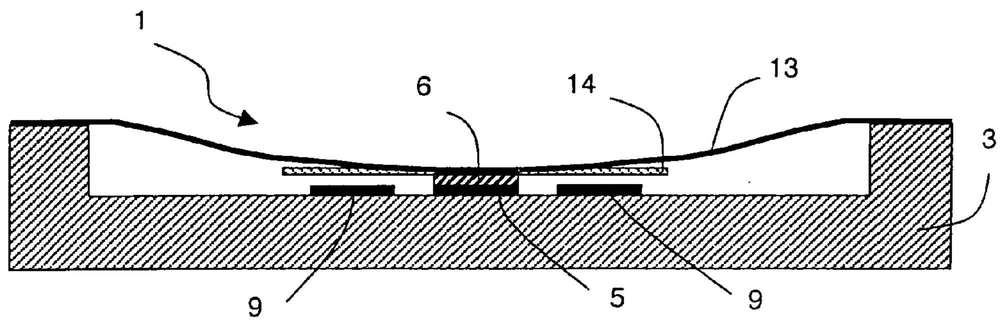
FIG. 7 represents the membrane according to FIG. 6 attached to a substrate, in cross-section along the axis A-A.

In FIGS. 5 to 7, a deformable membrane 12 of a microswitch 1 with thermal actuation and electrostatic holding comprises two substantially parallel flexure arms 13 comprising the thermal actuating means 4 of the microswitch 1 at the ends of said arms. The membrane 12 comprises a contact arm 14, between the flexure arms 13, said contact arm being substantially parallel to the flexure arms 13 and preferably comprising two electrostatic holding electrodes 15 arranged on each side of the conducting pad 6 of the membrane 12.

For example, the flexure arms 13 are formed by bimetal strips which present good deformation characteristics under the effect of a temperature variation. The thermal actuating means 4 are for example formed by heating resistors inserted in the ends of the flexure arms 13 of the membrane 12.

As represented in FIGS. 6 and 7, deformation of the flexure arms 13 results in movement of the contact arm 14 in a direction substantially parallel to the substrate 3 (FIG. 7), so that the contact arm 14 is not deformed, or is hardly deformed, on actuation of the microswitch 1. High deformation areas 20 of the flexure arms 13, represented in dark grey in FIG. 6, are situated in the central part of the flexure arms 13. In FIG. 6, the variation of the grey levels illustrates a more or less high deformation of the flexure arms 13. The end areas 21 of the flexure arms 13, represented in light grey, are the areas associated with thermal actuation of the microswitch 1, i.e. the small deformation areas.

The contact arm 14 is attached to the flexure arms 13 at the level of the high deformation areas 20 thereof, i.e. in the central parts thereof. The electrostatic holding electrodes 15, situated on this contact arm 14, therefore move in a direction substantially parallel to the substrate 3 and are not deformed, or are hardly deformed, on actuation of the microswitch 1 by thermal effect.

In FIG. 7, the flexure arms 13 are attached via the ends thereof to salient edges of the substrate 3. In this second stable position, which corresponds to the switched position of the microswitch 1, the conducting pad 6, fixedly secured to the contact arm 14 of the membrane 12, is in contact with the conducting pad 5 of the substrate 3. The contact arm 14 is substantially parallel to the substrate 3 and the electrostatic holding electrodes 15, which are not deformed, are located at a very small distance facing the electrostatic holding means 9 of the substrate 3, complementary to the electrodes 15, so as to hold the membrane 12 in this stable position. Due to the effect of the electrostatic holding voltage, the contact arm 14 can descend until it comes into contact with the electrostatic holding means 9. In this case, a dielectric layer (not represented) is then required between the contact arm 14 and the electrostatic holding means 9 to insulate the arm 14 from the means 9.

The electrostatic forces generated in the small air-gap comprised between the contact arm 14 and the electrostatic holding means 9 of the substrate 3 result in the membrane 12 of the microswitch 1 being held in this position. The electrodes 15 are not deformed, or are hardly deformed, which results in an improved dependability of the microswitch 1.

Figure 8:
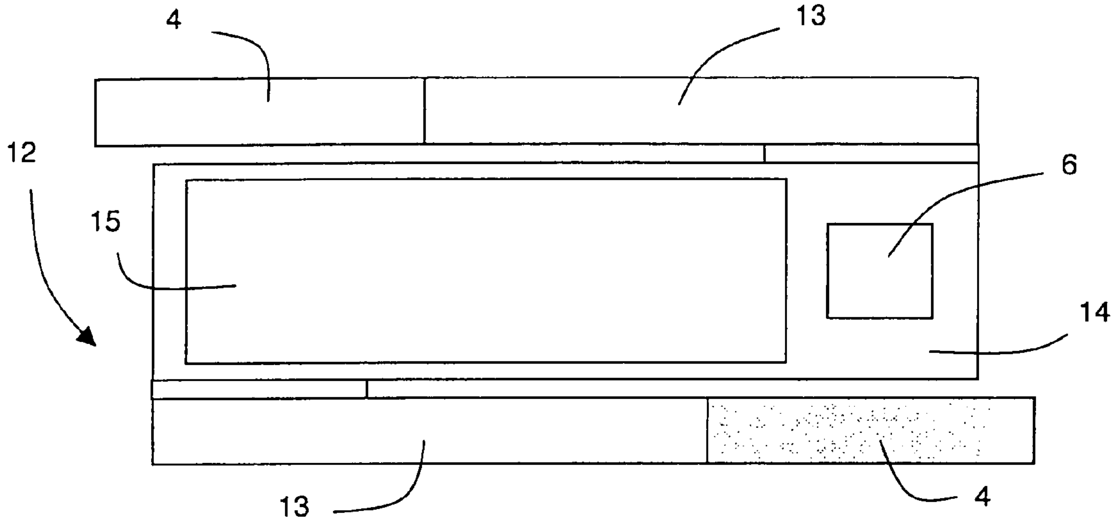
FIG. 8 represents an alternative embodiment of a deformable membrane according to the invention, in top view.
Figure 9:
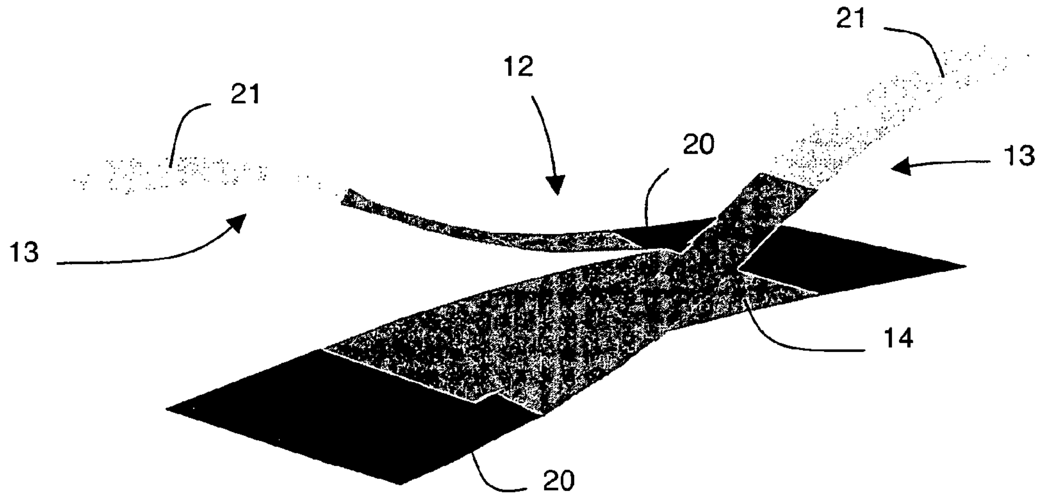
FIG. 9 represents the deformation of the membrane according to FIG. 8, in perspective view.

The embodiment represented in FIGS. 8 and 9 differs from the previous embodiment by the shape of the flexure arms 13 and of the contact arm 14 of the membrane 12. The flexure arms 13 are in this case attached to the substrate 2 via one of the ends of the arms only. Each flexure arm 13 thus comprises a first end fixedly secured to the substrate 3 (not shown) and a second end fixedly secured to the contact arm 14. The end of each flexure arm 13 fixedly secured to the substrate 3 comprises the thermal actuating means 4, for example heating resistors. The contact arm 14, arranged between the two flexure arms 13, may comprise a single electrostatic holding electrode 15, the conducting pad 6 of the membrane 12 then being located on the same side as the contact arm 14.

As represented in FIG. 9, the high deformation areas 20 of the flexure arms 13 of the membrane 12 are the two ends fixedly secured to the contact arm 14. The two adjacent flexure arms 13 are therefore attached to the contact arm 14 in opposite manner, i.e. the first end of a flexure arm 13 is fixedly secured to the substrate 3, whereas the second end is fixedly secured to a first end of the contact arm 14. The first end of the flexure arm 13 adjacent to the first flexure arm is then fixedly secured to the second end of the contact arm 14, whereas the second end of the flexure arm 13 adjacent to the first flexure arm is fixedly secured to the substrate 3. Deformation of the membrane 12, represented in FIG. 9, illustrates this fixing of the flexure arms 13 “in opposition”, with the contact arm 14 moving in a direction substantially parallel to the substrate 3.

The high deformation areas 20, represented in dark grey, are therefore the ends of the flexure arms 13 fixedly secured to the contact arm 14, whereas the low deformation areas 21, represented in light grey, are the ends of the flexure arms 13 attached to the substrate 3 and comprise the thermal actuating means 4.

The substrate 3 (not shown for this embodiment) is then shaped in such a way as to operate in conjunction with the membrane 12. It comprises a conducting pad 5, facing the conducting pad 6 of the contact arm 14, and electrostatic holding means 9 facing the electrode 15 of the contact arm 14.

Such a deformable membrane 12 according to FIGS. 8 and 9 enables a more compact microswitch 1 to be obtained.

Position change of the microswitch 1 according to the embodiments described above takes place as follows. In the first stable position of the microswitch 1, the membrane 12 is substantially horizontal and parallel to the substrate 3, being attached to the latter by the salient edges of the substrate 3. The bimetal strips of the flexure arms 13 are solicited for example by flow of a current in the heating resistors. Actuation of the flexure arms 13 results in deflection of the membrane 12 of the microswitch 1 until contact is made or very nearly made between the conducting pads 5 and 6. A potential difference is then applied between the electrostatic holding electrodes 15, arranged on the bottom surface of the contact arm 14, and the complementary holding means 9 achieved on the substrate 3. Finally, after the power supply to the heating resistors has been stopped, the microswitch 1 remains in its second stable position (FIGS. 6, 7 and 9). To perform a position change of the microswitch 1 in the opposite direction, the potential difference applied between the electrodes 15 and the electrostatic holding means 9 is cancelled, which results in the membrane 12 being raised to its initial position, i.e. the first stable position.

The microswitch 1 comprising a membrane 12 according to FIGS. 5 and 8 is produced using known microelectronics techniques. For example, the materials used for producing the microswitch 1 are silicon oxide ($SiO_2$) or silicon nitride ($Si_xN_y$) for the substrate 3, aluminium (Al) for the thermal bimetal strip actuator, titanium nitride (TiN) for the heating resistor, titanium (Ti), aluminium (Al) or a chromium and gold alloy (Cr/Au) for the electrodes 15 and electrostatic holding means 9, and gold (Au) or platinum (Pt) for the conducting pads 5 and 6.

Whatever the embodiment of the microswitch 1, the contact arm 14 supporting the electrostatic holding electrodes 15 is preferably elongate. In the particular embodiment of the microswitch 1 represented in FIGS. 5 and 6, the contact arm 14 presents a length that is larger than half of the length of the flexure arms 13. In the alternative embodiment of the microswitch 1 represented in FIGS. 8 and 9, the contact arm 14 presents a length that is close to the length of the flexure arms 13. This results in a significant gain in space, for it is possible to produce a very dependable microswitch 1 with low consumption and having dimensions able to be smaller than 100 $\mu m^2$.

The different embodiments of the microswitch 1 described above in particular provide the following advantages, i.e. low actuating and electrostatic holding voltage, of about 5V, low consumption, preservation of all the advantages of actuation by bimetal strip (large deflection amplitude, high energy density, low actuating voltage) and fabrication implementing a technology compatible with that of integrated circuits.

Moreover, the microswitch 1 having two stable positions, the first position wherein electric contact is interrupted and the second position wherein electric contact is established, only switching from one position to the other consumes energy and the microswitch 1 can, after actuation, remain in the first stable position without any additional power being provided and remain in the second stable position with a very limited power input (holding voltage) on account of the proximity of the electrodes 15 and of the electrostatic holding means 9 in this position.

The invention is not limited to the embodiments described above. The actuating means 4 of the microswitch 1 can in particular comprise a piezoelectric actuator. The flexure arms 13 then comprise at least one layer of piezoelectric material. They may also be formed by SiN/piezoelectric layer bimetal strips and are provided with excitation electrodes on their top and bottom faces.

In the case of a piezoelectric actuator, a voltage is then applied to the piezoelectric layer of the flexure arms 13 to cause deformation of the flexure arms 13. For example, the materials used to produce the piezoelectric actuator are lead zirconate titanate (PZT), aluminium nitride (AlN) or zinc oxide (ZnO).

Moreover, the membrane 12 can comprise additional flexure arms 13, contact arms 14, electrodes 15 and conducting pads 6, the electrodes 15 and conducting pads 6 still being arranged on the contact arms 14. In the case of a membrane 12 according to FIG. 8 comprising additional flexure arms 13, the contact arms 14 are then attached in the same way to the adjacent flexure arms 13, with the ends of the flexure arms 13 attached "in opposition".

The preferred applications for the microswitch 1 are, in a general manner, all applications using microswitches in the electronics and microelectronics fields, and more particularly radiofrequency applications, i.e. antenna microswitches, transceivers, band microswitches, etc.

The invention claimed is:

1. A microswitch comprising a deformable membrane, the microswitch comprising:

at least two flexure arms, each comprising two opposite ends, each end being directly attached to a substrate, at least one contact arm arranged between the at least two flexure arms, the contact arm being independently and directly attached to each of said flexure arms in a central part of said flexure arms, the contact arm remaining substantially parallel to the substrate and deforming less than the at least two flexure arms upon actuation of the microswitch, the at least two flexure arms and the contact arm being substantially parallel to each other in a first stable position, the flexure arm comprising actuating means disposed adjacent to the substrate designed to deform the flexure arms, from the first stable position of the microswitch to a second stable position in such a way to establish in the second stable position an electric contact between at least a first conducting pad formed on the substrate and at least a second conducting pad arranged on the contact arm, and complementary electrostatic holding means respectively fixedly secured to the membrane and the substrate and designed to hold the microswitch in the second stable position of the membrane.

2. The microswitch according to claim 1, wherein the actuating means of the microswitch comprise a thermal actuator.

3. The microswitch according to claim 2, wherein the thermal actuator comprises a heating resistor inserted in at least one end of the flexure arms.

4. The microswitch according to claim 1 wherein the actuating means of the microswitch comprise a piezoelectric actuator.

5. The microswitch according to claim 1, wherein the flexure arms are bimetal strips.

6. The microswitch according to claim 1, the electrostatic holding means being at least attached to the contact arm.

7. The microswitch according to claim 6, wherein the contact arm supporting the electrostatic holding means is elongated.

8. The microswitch according to claim 6, wherein the electrostatic holding means of the contact arm comprise at least one electrode.

* * * * *